No. 704,533. Patented July 15, 1902.
P. GARRETT.
METHOD OF PREPARING SPARKLING WINES.
(Application filed Jan. 31, 1901.)
(No Model.)
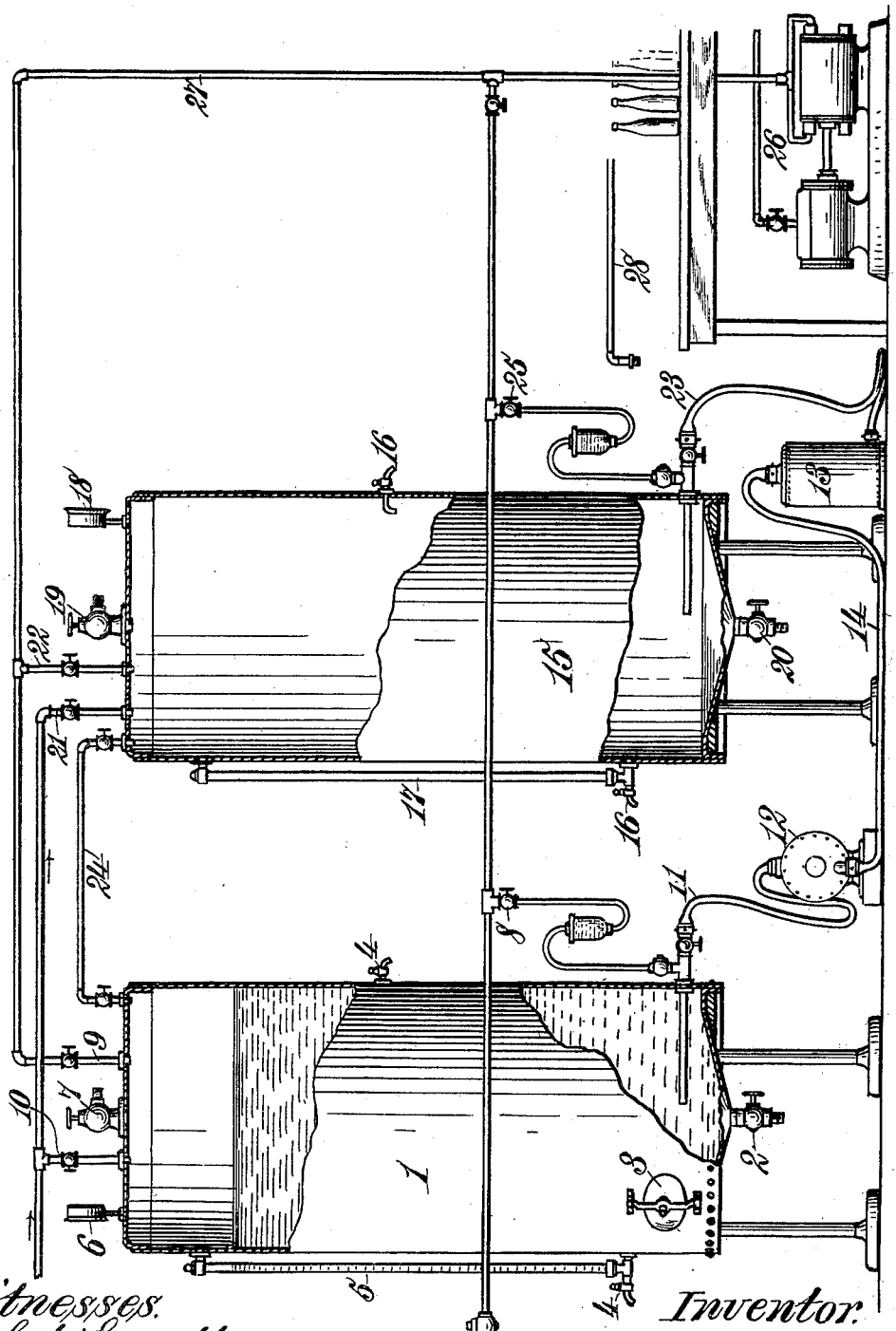
Witnesses.
Robert Everett.
N. L. Bogan.
Inventor.
Paul Garrett,
By James L. Norris
Atty.
THE NORRIS PETERS CO., PHOTO-LITHO., WASHINGTON, D. C.

UNITED STATES PATENT OFFICE.

PAUL GARRETT, OF WELDON, NORTH CAROLINA.

METHOD OF PREPARING SPARKLING WINES.

SPECIFICATION forming part of Letters Patent No. 704,533, dated July 15, 1902.

Application filed January 31, 1901. Serial No. 45,493. (No specimens.)

*To all whom it may concern:*

Be it known that I, PAUL GARRETT, a citizen of the United States, residing at Weldon, in the county of Halifax and State of North Carolina, have invented new and useful Improvements in Methods of Preparing Sparkling Wines, of which the following is a specification.

This invention relates to a certain new and improved method of preparing sparkling wines; and the object thereof is to simplify the mode now in general use of preparing sparkling wines before bottling thereof, improve the product thereby obtained, cheapening the cost of manufacture, and to more rapidly and reliably treat the wine in bulk, so that it is subjected to a sufficient fermentation and the requisite quantity of natural carbonic gas retained therein previous to the bottling operation without having to resort to the introduction by artificial means of an additional quantity of carbonic gas, thereby insuring the proper conditions when bottled; and to this end the method consists of the novel manner hereinafter more specifically described for the preparation of sparkling wines.

To enable others skilled in the art to more clearly understand the carrying out of my new and improved method of preparing sparkling wines, I have illustrated in the accompanying drawing one form of an apparatus for that purpose and which is shown in sectional elevation.

In describing the one form of apparatus shown in which my improved method of preparing sparkling wines can be carried out, 1 indicates the fermentation-tank; 2, the draw-off cock for the residuum; 3, a cover closing a suitable opening to permit of entrance to the tank; 4, a sample cock and tube; 5, the gage-glass; 6, a pressure-gage; 7, a safety-valve in communication with a gas-reservoir; 8, a valve connected to an air-filter 8′ for the introduction of pure air and which is in communication with a suitable air-supply and also with the interior of the tank 1; 9, a gas or air pressure supply pipe; 10, a filling-pipe; 11, an outlet-pipe for the fermented product;
12, a draw-off pump connected to the pipe 11; 13, a filter, and 14 a pipe connection between the pump 12 and filter 13.

The reference-numeral 15 denotes the clarifying-tank, provided with a sample cock and tube 16, gage-glass 17, gage 18, safety-valve 19 in communication with a gas-reservoir, draw-off cock 20, a filling-pipe 21, gas or air pressure supply pipe 22, and a supply-pipe 23 for the fermented product connected to the filter 13.

Tanks 1 and 15 are in communication at their top with each other by means of the auxiliary gas or air pressure conducting pipe 24, and the tank 15 is provided with a suitable inlet-valve 25, connected to an air-filter 8′ for the admission of pure air, arranged and connected in the same manner as the filter 8.

The reference-numeral 26 denotes a pump or compressor in communication with the gas-reservoir or atmosphere and connected to the main gas or air pressure supply pipe 27, the latter being connected to the pipes 9 and 22.

The reference-numeral 28 denotes a portion of a bottling apparatus.

The pipes 9, 10, 21, 22, 11, and 23 are provided with suitable cut-offs, as shown.

In carrying out my new and improved method for preparing sparkling wines I place the juice of the grapes into the closed fermenting-tank 1, which is so constructed as to withstand the necessary pressure up to one hundred and fifty pounds, if it be necessary. The tank may be constructed of any desirable material providing it is not injurious to the wine—for example, a wooden tank heavily hooped and braced, iron or other metallic tanks lined with porcelain, or a brass tank lined with nickel or silver, the sole conditions of the material for the tanks being such that it will withstand the pressure and will not injure the aroma or taste or appearance of the wine. The shape of the tank may be of any desired configuration, but that as shown in the accompanying drawing is the preferred one. After the fresh juice has been placed in the fermenting-tank the first fermentation as well as the second fermentation is conducted under pressure at will generated by its own formation of gas, the pressure being adjusted, and thus the delicate aroma of the fruit is retained in the greater degree, this aroma being often thrown off very largely in the first fermentation. It is a well-established fact that in all ordinary methods wines undergo what is termed a "first" and "second" fermentation. The first fermentation takes place ordinarily and unless prevented immediately after the pressure of the juice, and owing to the greater amount of yeast and vegetable matter and solid constituents of the juice it is violent to a greater or less degree, great quantities of carbonic gas being thrown off. With this gas certain aromas escape, some of which it may be desired to retain, and this is made possible by the ability to prevent to a greater or less degree the escape of the gas. It may not be desirable to retain any of the gas from the first fermentation, in which event the gas may be pumped off, and a vacuum formed by which fresh air may be admitted in such manner that it percolates through all the wine, and the fermentation is hastened. Some wine it may be desirable to ferment rapidly, others slowly, depending on the character of the juice and the character of wine desired. The temperature is controlled and means employed whereby by either smothering or, as it were, fanning the process of fermentation may be governed at will. This fermentation is governed in the manner referred to, and which is termed the "first" fermentation, which, as before stated, is a violent one. The second fermentation, which is slower, usually takes place when the warm weather or the following spring sets in. This slower fermentation is called the "second" fermentation. If desired, it may be arranged to preserve in specially-prepared vessels of great resisting power the gas that may be considered a surplus and which is thrown off through a safety-valve 7, connected to a gas-reservoir. Again, the fermentation may be permitted to proceed without any cessation by proper adjustment of temperature, so as to perfect the same in two or three months instead of waiting for the following spring, thereby holding the foreign matter in suspense in the meanwhile. This method admits of the careful examination of the wines, which examination is an absolute test of the entire quantity and can be made by means of the sample-cock 4. If it is found that certain elements are lacking—elements that are contained in other wines and deficient in this—blends may be made at any time—that is to say, if the wine is too dry or sour a syrup or other ingredient may be introduced in any of the valves entering the tank at the top, bottom, or side by a pressure-pump, drawing off, if need be, a sufficient quantity of wine to make room for the syrup or wine added. So two casks of wine, each possessing a distinctive and different merit and both being improved by blending, (a thing occurring daily in the preparing of sparkling and still wine,) may be blended into one or more tanks in the manner provided and at any stage by racking off into other tanks, making the proportions as desired, or, in other words, the manufacturer will have as much control of the sparkling wines as he now has of his still wines, only a little more care being necessary, but no more than should be exercised at all times by a person interested in his work. By the old process of fermenting and clarifying in bottles the blends have to be made before bottling and if an error is made the entire lot is practically ruined and the goods must be marketed in their poor condition or reworked at a great loss.

In case that the fermentation is delayed at any time by any causes fresh pure air may be introduced into the fermentation-tank, which will accelerate the fermentation to a great degree, or fermenting-germs scientifically prepared may be introduced when desired and at any stage. When blending is desired after the fermentation has been perfected and the time for racking and bottling arrives, the tank 15 is employed, which is thoroughly cleansed. With the pump or compressor 26 a pressure in the clarifying-tank of natural carbonic gas previously generated in the fermentation of the juice of the grape and which has been stored (or compressed air) is produced in excess of that shown in the fermenting-tank 1 to be racked off. If the pressure in the fermenting-tank should be eighty pounds, the pressure produced in the clarifying-tank should be eighty-five pounds or more, the connecting-pipe 24 establishing communication between the two tanks, the cocks of the connecting-pipe 24 being opened after the pressure in the clarifying-tank is obtained. The connection being made absolutely tight, both cocks are open, one from the gas or air pressure supply pipe 21 first, then the cocks of the pipes 24. At once an equilibrium is established and of greater pressure on the wine than the gas has formed, this greater pressure preventing any escape of gas when the racking begins.

The wine is gently pumped from its lees in the fermenting-tank to the clarifying-tank by means of the pump 12, which is connected to the draw-off pipe 11, and owing to the fact that the clarifying-tank is charged with a pressure greater than the gas exerts in the wine the former is held in the latter. At this stage it will be necessary to recall that the wine has by this time arrived at a stage where there is considerable pressure from the generation of carbonic gas by fermentation in the wine, and this pressure may be anywhere from twenty pounds to one hundred pounds, according to the idea of the manufacturer and the needs of each case. It will be found by testing the stock of any champagne-maker that the pressure in each bottle varies considerably, and the experience of each wine-maker must be his guide. I have used the figures eighty or eighty-five pounds as perhaps being the maximum that will be undertaken. Now if the empty tank (empty of wine) is charged so as to be effective against the escape of the gas in the wine when the connection is open it is plain that it must be charged to a slightly-higher pressure than is shown by the gage on the wine-tank, for if the pressure is less immediately when the connection is made there is a less pressure on the wine-tank, ebullition starts up, and in champagne it is from the bottom that the effervescence arises, and it will stir up the contents of the wine-tank or fermenting-tank and destroy the whole operation of clearing, giving the filter more work to do than is at all necessary. In fact, this very proposition of pressure in the empty tank of a product of the wine itself is practically the essential feature of the invention. Without this surplus pressure from a substance which resists absorption of a similar gas and does not mingle with the wine and which, if it should, is a product of the wine and cannot in any manner damage or injure it in the least the object of the invention would fail of its application. As to an absolute degree of pressure, one manufacturer may use twenty pounds and feel it sufficient for that class of wine, another may want fifty pounds and be not satisfied with less, while still another may want one hundred for experimentation, if for nothing else. The foregoing principle is the same whether the pressure used is one pound or one hundred pounds. While compressed natural carbonic gas taken from the wine in the first stages of fermentation is the preferred medium for this operation of retaining the gas within the wine, other gases, fluids, or compressed air may be used, if preferred, provided they do not injure or mix with the wine. To still further prevent the escape of the natural carbonic gas, the room in which the operation is being carried on may previously be reduced in temperature, thus reducing the temperature of the wine also, to nearly the freezing-point—say 35°—thus preventing still further any escape of the carbonic gas. The wine being drawn off the lees, the clarifying-tank is hermetically closed, except, of course, the safety-valve 19 and the pressure-gage 18. The surplus pressure of gas may be let out through the safety-valve and returned to the gas-reservoir. Any syrup or other ingredients desired may be pumped into the wine at any time. A pressure-filter 13 may be interposed between the pump and the clarifying-tank that is being filled, and thus the work of the clarifying expedited. The foregoing operation may be repeated as often as willed and as necessary to perfect the wine. After the wine has been drawn from the fermenting-tank the cock of the pipe 24 is closed and the gas pumped to the reservoir for further use, and the tank may be washed and prepared to receive the contents of any other cask it is desired to rack.

When it is desired to bottle the wine, the gas-compressor is attached directly to the clarifying-tank from which the bottles are to be filled and a uniform pressure maintained while the wine is being pumped to the bottling-table, where the bottles are filled, as with carbonated beverages, or it may be forced to the filter by maintaining a sufficient pressure from the gas-compressor.

It is thought the advantages of the method are the saving of labor, the ability to carefully watch the progress of the wine as practically as with still wines to make any changes in the blends in the stages of the process, avoiding great waste of breakage and disgorging, saving of space, more perfect control of the product at all times, preserving more perfectly the most delicate aromas, (it being possible to let the gases escape whenever desirable,) the ability to introduce, if desired, any fermenting-germs which it is claimed will produce certain qualities in the wine not otherwise attainable, the more perfect clarification, the more perfect fermentation, and the thorough manner in which sparkling wines can be treated. Of course the method is not limited to the specific form of apparatus shown, as various changes may be made in the details of construction and other devices employed. Any appliances for regulating the temperature at will in the vaults may be employed, and by the foregoing arrangement it will be possible by the method disclosed to make sparkling wines in larger quantities and of more uniform quality than was ever possible under the old plan of filling the bottles during the fermentation. This will not only cheapen the cost of the manufacture, but improve the quality of the product, owing to the fact that absolute control of the wine is at any and all times possible, which is not the case when once bottled. If it be evident that the wine is not progressing nicely, (as is frequently the case with still wines,) other wines may be introduced or other elements which shall cure any trouble during the fermentation, it simply resting with the skill of the manufacturer to supply the remedies, a thing impossible if the wine has been bottled in the manner as heretofore stated, because in the event of its having been bottled and the blend being unsatisfactory the only recourse is uncorking and making a new blend, and consequently the gas will have all been lost and the fermentation period having been passed it will be impossible to generate again the gas necessary by natural means. It is thought the foregoing and many other advantages can be readily understood from my new and improved method of preparing sparkling wines.

Having thus fully described my invention, what I claim as new, and desire to secure by Letters Patent, is—

A method of preparing sparkling wines in bulk, consisting in fermenting the material in a closed receptacle under pressure of the natural carbonic-acid gas given off during the fermentation stage, drawing slowly the fermented wine from the said closed receptacle through a filter into a closed clarifying-tank where the wine is clarified, subjecting the fermented wine simultaneously with the drawing off thereof through the filter to pressure of natural carbonic-acid gas externally supplied to the closed receptacle, and then finally subjecting the wine in bulk during the clarification stage within the clarifying-tank to pressure of natural carbonic-acid gas externally supplied for retaining the carbonic-acid gas generated during the clarification stage within the wine thereby producing a finished product for bottling.

In testimony whereof I have hereunto set my hand in presence of two subscribing witnesses.

PAUL GARRETT.

Witnesses:
H. D. JORDAN,
L. A. WELLER.